US008838677B2

(12) United States Patent
Persson et al.

(10) Patent No.: US 8,838,677 B2
(45) Date of Patent: Sep. 16, 2014

(54) PROXY SERVER

(75) Inventors: Patrik Persson, Lund (SE); Per Persson, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 652 days.

(21) Appl. No.: 12/626,410

(22) Filed: Nov. 25, 2009

(65) Prior Publication Data

US 2011/0125833 A1    May 26, 2011

(51) Int. Cl.
G06F 15/16    (2006.01)
G06F 17/30    (2006.01)
H04L 29/08    (2006.01)

(52) U.S. Cl.
CPC ...... *G06F 17/30905* (2013.01); *H04L 67/2823* (2013.01)
USPC .......................................... 709/203; 709/224

(58) Field of Classification Search
CPC .................. H04L 67/2823; G06F 17/30905
USPC ........................ 709/203, 217, 219, 246, 224
See application file for complete search history.

(56) References Cited

U.S. PATENT DOCUMENTS

| | | | |
|---|---|---|---|
| 6,374,305 B1 | 4/2002 | Gupta et al. | |
| 6,535,922 B1 | 3/2003 | Kikinis | |
| 7,120,702 B2 * | 10/2006 | Huang et al. | 709/246 |
| 2007/0083810 A1 * | 4/2007 | Scott et al. | 715/525 |
| 2008/0120538 A1 * | 5/2008 | Kurz et al. | 715/255 |
| 2009/0210514 A1 | 8/2009 | Davis et al. | |

FOREIGN PATENT DOCUMENTS

| | | |
|---|---|---|
| EP | 1853019 A1 | 11/2007 |
| KR | 20020008579 | 1/2002 |
| WO | 01/86462 A1 | 11/2001 |

OTHER PUBLICATIONS

J. González et al., Multi-Format Web Content Transcoding for Mobile Devices, Seventh Mexican International Conference on Computer Science (ENC'06), pp. 109-115, IEEE (2006).

T.-Y. Chang et al., Cut-Load: Application-Unaware Content Partitioning for Web-based Information Access in Wireless Data Networks, IEEE International Conference on Communications, vol. 1, pp. 409-416 (Jun. 2006).

Y. Chen et al., Adapting Web Pages for Small-Screen Devices, Internet Computing, vol. 9, No. 1, pp. 50-56, IEEE Computing Society (2005).

T. Laakko et al., Adapting Web Content to Mobile User Agents, Internet Computing, vol. 9, No. 2, pp. 46-53, IEEE Computer Society (2005).

(Continued)

*Primary Examiner* — David X Yi
(74) *Attorney, Agent, or Firm* — Patent Portfolio Builders PLLC

(57) ABSTRACT

Methods and a preprocessing proxy server in a communication system can support any mode of web browser operation and enable a user selectively to bypass or enable the proxy server's translation of requested web content. For example, a translation selection decision can be made based on the requested content (e.g., active HTML) or user input. Selection is made between the original representation of a web page and a translated one, i.e., a representation that is adapted to one or more characteristics of the receiving device, such as a smaller screen, lower screen resolution, low communication bandwidth, etc. The decision on whether to translate is preferably made by a proxy server in the network, and the decision is based on one or more of the following criteria: requested-page content, user preferences, and statistics. An advantage of interposing a proxy server in this arrangement is that all web servers can remain unchanged.

5 Claims, 3 Drawing Sheets

(56) References Cited

OTHER PUBLICATIONS

EPO, Intl Search Report in PCT/EP2010/067461, Feb. 16, 2011.
EPO, Written Opinion in PCT/EP2010/067461, Feb. 16, 2011.
M. Hori et al., Annotation-Based Web Content Transcoding, Computer Networks, vol. 33, No. 1-6, pp. 197-211, Elevier Sci. Pubs., Jun. 1, 2000.
N. Bhatti et al., Web Server Support for Tiered Services, Network, vol. 13, No. 5, pp. 64-71, IEEE, Sep. 1, 1999.

* cited by examiner

PROXY SERVER

BACKGROUND

This invention relates to electronic communication systems and more particularly to web browsing and browsers in such systems.

Web browsing using mobile phones is limited by several factors, including screen size, input device, connection speed, and subscription rate (e.g., flat-rate charging vs. per-kilobyte charging). Some handset vendors, most notably Apple Inc., Cupertino, Calif., USA, for its iPhone cellular telephone, provide a standard web browser, while other handset vendors provide mobile versions of other web browsers that account for, in particular, the limited form factor of handsets.

From a handset user's perspective, some web pages may be hard to interact with using a standard or downscaled web browser because of assumptions made by the web page designers about the viewing area that will be available. For example, it may have been assumed that the viewing area would be at least 800×600 pixels or 1400×1050 pixels. Buttons and dialog boxes positioned and sized for such viewing areas can be difficult to translate to viewing areas of 320×320 pixels and the like that are typical of handsets. Furthermore, for a handset user paying for content by the megabyte or saddled with a low-bandwidth connection, some pages impose such high penalties in cost or download time that the user is discouraged from viewing them.

One approach to reducing the limitations of handheld web browsing is to interpose a proxy server in the chain between the handset and the content server. The proxy server preprocesses pages requested by a handset, for example by replacing the original requested page by a dynamically generated replacement page that is reformatted to better suit the mobile web browser. Operations such as downscaling of images to reduce bandwidth use may be performed in the proxy as part of its preprocessing. This approach is taken by, for example, Opera Software ASA, Oslo, Norway.

This and other approaches to adapting, or translating, web content to accommodate the limitations of mobile devices, such as cellular telephone handsets, are described in the literature.

T.-Y. Chang et al., "Cut-Load: Application-Unaware Content Partitioning for Web-based Information Access in Wireless Data Networks", IEEE International Conference on Communications, vol. 1, pp. 409-416 (June 2006) describes a content-translating proxy for adapting web content to mobile devices, in which the decision to translate is based on several factors, such as thin-friendliness, size of content, and network conditions. In a "normal" mode, the client application operates as a normal web client, and in a "dual" mode, the client initially operates in a "thin" mode while processing requested content in the background. Chang's system of "graphical content partitioning" automatically divides requested content into several smaller pieces that can be downloaded one at a time. If an entire large page is downloaded, the overhead of the partitioning results in a larger bandwidth requirement than the original page, and so Chang implements "dynamic mode selection" based on network signal-to-noise ratio and a "body-mass index" (BMI) of the requested document, which is defined as the document's size in bytes divided by the square of the page size in pixels.) Depending on the result of this test, the partitioned or the original page is transmitted.

International Publication WO 01/86462 describes a proxy server for translating web content (e.g., pages written in hypertext markup language (HTML) and or extensible markup language (XML)) for mobile devices, such as cellular phones. Translation is done according to user preferences that are transferred to the proxy server and stored in a database, but no ability to translate or not is disclosed.

Y. Chen et al., "Adapting Web Pages for Small-Screen Devices", Internet Computing, vol. 9, no. 1, pp. 50-56, IEEE Computing Society (2005); and T. Laakko et al., "Adapting Web Content to Mobile User Agents", Internet Computing, vol. 9, no. 2, pp. 46-53, IEEE Computer Society (2005) relate to proxy adaptation for mobile web browsing, including algorithms for translating web pages, but no ability to translate or not is disclosed.

U.S. Pat. No. 6,535,922 describes a system for adapting Internet data, such as web pages, to portable/handheld computers that have limited capabilities for processing, power, screen size, and screen resolution. A web server capable of translating HTML data communicates requested pages to the portable device, which can transfer specific characteristics, such as screen size and resolution, to the server so that the server can adapt the requested pages before serving them to the portable device.

J. González et al., "Multi-Format Web Content Transcoding for Mobile Devices", Seventh Mexican International Conference on Computer Science (ENC '06), pp. 109-115, IEEE (2006) describes adaptation using a client-side proxy and a server-side proxy, including transcoding (i.e., translating) web pages based on an extensible stylesheet language (XSL) description provided by the client. The client informs the server of its requirements on the web page.

U.S. Pat. No. 6,374,305 describes a mobile browser that is able to use conventional web-based applications by using two specialized software layers: a proxy layer on the mobile device and a web agent on the server.

Even with a preprocessing proxy server, however, some pages simply will not be displayed properly on all of the wide variety of handsets that are commercially available. Problems are typically encountered with pages that include dynamic HTML or asynchronous JavaScript and XML (AJAX), and secure pages delivered over secure sockets layer (SSL). As a result, users are forced to have two or more separate browsers installed on the handsets, and to switch between the browsers according to the pages requested.

SUMMARY

In one aspect of this invention, there is provided a method in a communication system of selectively preprocessing web pages. The method includes receiving a web page request, where the request indicates at least one communication preference; in response to the request, retrieving a web page corresponding to the request from a web server; determining whether to translate the retrieved web page based on the at least one communication preference and content of the retrieved web page; and serving either the retrieved web page or a translated web page in response to the request.

In other aspects of this invention, there is provided a preprocessing proxy server for a communication network. The proxy server includes an electronic processor configured to receive web pages requested by a UE and information indicating at least one communication preference of the UE, to determine whether to translate a requested web page based on the at least one communication preference and content of the received web page, and to serve to the UE either the requested web page or a translated web page.

In other aspects of this invention, there is provided a computer-readable medium having instructions that, when executed by a computer, cause the computer to perform a method in a communication system of selectively preprocessing web pages. The method includes receiving a web page request that indicates at least one communication preference; in response to the request, retrieving a web page corresponding to the request from a web server; determining whether to translate the retrieved web page based on the at least one communication preference and content of the retrieved web page; and serving either the retrieved web page or a translated web page in response to the request.

BRIEF DESCRIPTION OF THE DRAWINGS

The several features, objects, and advantages of this invention will be understood by reading this description in conjunction with the drawings, in which.

DETAILED DESCRIPTION

The inventors have recognized that a preprocessing proxy server and web browser can support any mode of browser operation and enable a user selectively to bypass or enable the proxy server's content translation via the user's handset. For example in contrast to Chang described in the BACKGROUND, this invention enables the translation selection decision to be made based on the requested content (e.g., active HTML) or user input. As described in more detail below, the invention encompasses methods for selecting between the original representation of a web page and a translated one, i.e., a representation that is adapted to one or more characteristics of the receiving device, such as a smaller screen, lower screen resolution, low communication bandwidth, etc. The decision on whether to translate is preferably made by a proxy server in the network, and the decision is based on one or more of the following criteria: requested-page content, user preferences, and statistics. An advantage of interposing a proxy server in this arrangement is that all web servers can remain unchanged.

Figure 1:
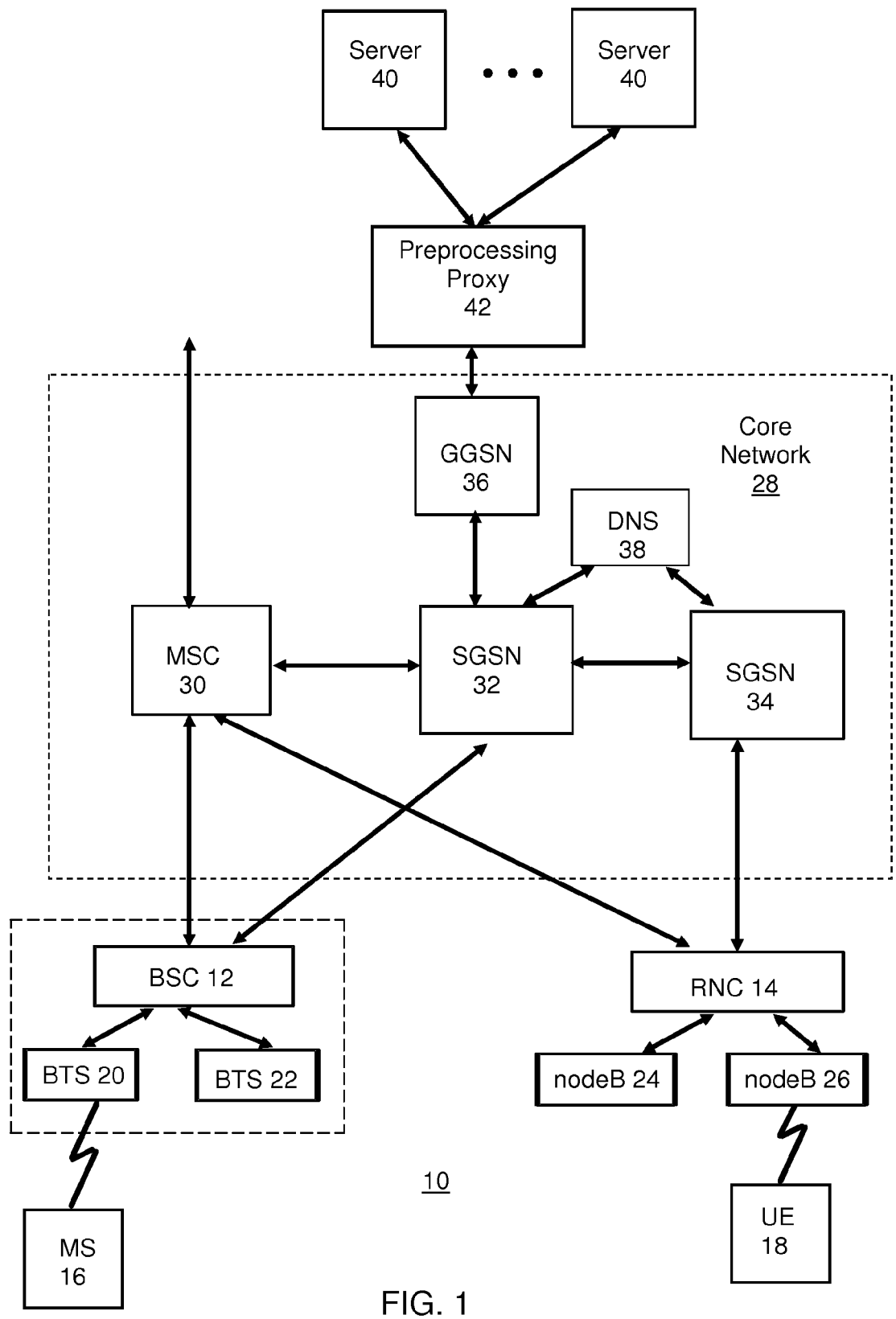
FIG. 1 depicts an electronic communication network.

The artisan will understand that the methods and apparatus described in this application can be implemented in many types of electronic communication networks, and in particular in mobile radio networks. FIG. 1 depicts a portion of a network 10 that includes a base station controller (BSC) 12 and a radio network controller (RNC) 14 that control various radio network functions, including for example radio access bearer setup, diversity handover, etc. More generally, the BSC and RNC direct connections to/from mobile stations (MSs) 16 and user equipments (UEs) 18, which may be mobile telephones or other remote terminals, via the appropriate base transceiver station(s) (BTSs) and nodeBs, which communicate with each MS and UE through downlink (i.e., BTS/nodeB to MS/UE) and uplink (i.e., MS/UE to BTS/nodeB) channels. BSC 12 is shown coupled to BTSs 20, 22, and RNC 14 is shown coupled to nodeBs 24, 26. Each BTS/nodeB serves a geographical area that can be divided into one or more cell(s). The BTSs/nodeBs are coupled to their corresponding BSC/RNC by dedicated telephone lines, optical fiber links, microwave links, etc. A BSC and its connected BTSs generally comprise a base station system (BSS), as indicated by the dashed lines in FIG. 1.

The BSC 12 and RNC 14 are connected to external networks such as the public switched telephone network (PSTN), the Internet, etc. through one or more nodes in a core network 28. As depicted in FIG. 1, the core network 28 includes a mobile switching center (MSC) 30, and packet radio service nodes, such as serving general packet radio service (GPRS) support nodes (SGSNs) 32, 34, and a gateway GPRS support node (GGSN) 36. Also shown in FIG. 1 is a domain name system (DNS) server 38 that is provided for internet protocol (IP) address resolution that is used by the SGSNs 32, 34 for enabling a UE 18 to access content available from one or more web servers 40. It will be appreciated of course that various names can be used for the devices depicted in FIG. 1, the functionalities of the entities depicted in FIG. 1 can be distributed among such entities in different ways, and for simplicity, the terminals 16, 18 are commonly called UEs in this application.

The preprocessing proxy server 42 can be placed at various places in the network depicted in FIG. 1. As shown in the figure, the proxy server functionality (e.g., receiving information on UE capabilities, receiving and analyzing requested web pages, and translating web pages based on the received UE capabilities) can be provided by a suitable processor 42 that stands outside the core network 28 between the servers 40 and the GGSN 36. As an alternative (not shown), the proxy server 42 can be located inside the core network 28 between the servers 40 and the GGSN 36. It is currently believed that placing the server 42 inside the core network 28 can facilitate alternative billing procedures, such as pay-per-page, free or lower-cost low-bandwidth versions, etc. Further alternative locations are between the UE 18 and the SGSN 34, inside or outside the core network 28, and incorporated into the SGSN 34 or the GGSN 36.

As described above, an important part of the network 10 is the proxy server 42, which implements an HTML processing mechanism that replaces a requested web page with a reformatted, rescaled, dynamically generated page based on either the user's equipment capabilities or on the user's request. The proxy server advantageously also has UE information such as type of subscription, and current type of connection (e.g., the connection bandwidth), as well as network-operator preferences and web server preferences. The preferences of the web servers 40 can be indicated to the proxy server 42 in any suitable way, e.g., through meta-tags or comments in the HTML source code of web pages. As described below, the UE information and network-operator preferences can be indicated to the proxy server 42 by adding suitable information in the HTTP headers of the page-request packets sent by the UE's browser to the proxy server 42.

Figure 2:
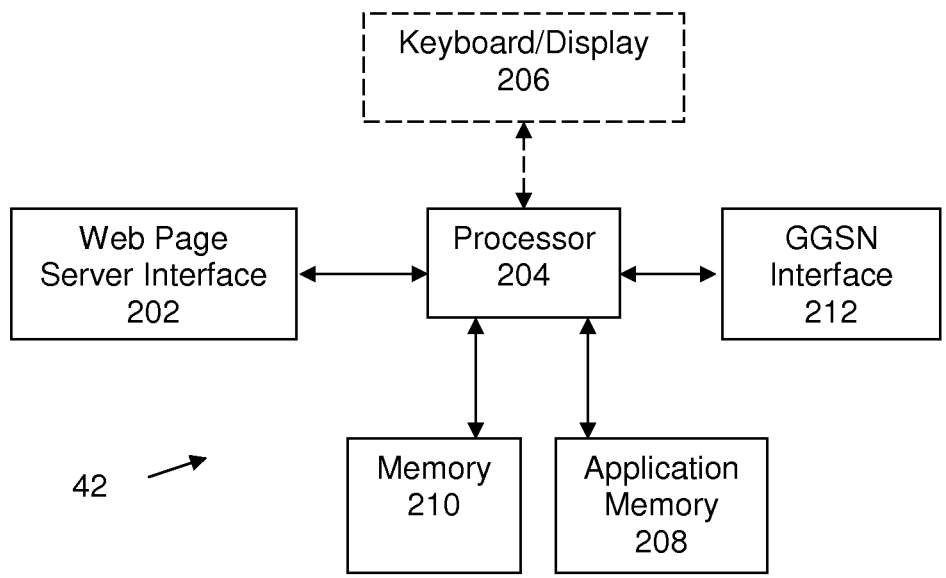
FIG. 2 is a block diagram of a preprocessing proxy server.

FIG. 2 is a block diagram of an exemplary proxy server 42 that is suitable for the invention described in this application. As depicted in FIG. 2, the proxy server 42 includes an interface 202 that is configured to exchange electronic signals with one or more web servers 40 in a network, such as the network 10. Information carried by those signals is handled by an electronic processor 204, which may include one or more sub-processors. The processor 204 executes one or more software modules and applications, including modules suitable for receiving web pages requested by a UE and information indicating at least one communication preference of the UE, to determine whether to translate a requested web page based on the at least one communication preference and content of the received web page, and to serve to the UE either the requested web page or a translated web page, and to carry out other operations of the proxy server 42 as described in this application. Information can be input to and output from an optional suitable keyboard and display 206. Software applications executed by the processor 204 can be stored in a suitable application memory 208, and the server 42 can download and/or cache desired information in a suitable memory 210. The proxy server 42 also includes a suitable interface 212 that is configured to exchange electronic signals with one or more GGSNs 36 in the network.

It will be understood that this invention is substantially independent of the arrangement of hardware in the proxy server 42. For example, the server functionality can be carried out by one or more suitable processors 204 that execute software residing in one or more application memories 208. For example, the processor can include a processing mechanism that replaces a requested web page with a reformatted, rescaled, dynamically generated page based on based on at least one of a type of network subscription, bandwidth of a current network connection to the UE, a network-operator preference, and a UE user's request.

The proxy server 42 is configured to implement an HTML processing mechanism that enables the proxy server 42 to implement the steps of receiving information about UE capabilities, receiving and analyzing UE-requested web pages, and translating web pages based on the received UE capabilities. The processing mechanism includes computer program code that can be written in any suitable language. For example, a simple mechanism written in BASIC-like pseudo code is as follows:

10 proxy 42 inspects the unconverted page (loaded from a server 40), the user's preference (as described by an HTTP header discussed below), any active policy (as discussed below), and information acquired by the Core Network 28, e.g., UE subscription rate and current bandwidth to the UE
    20 if the policy specifies that the user can view only converted pages, goto 100
    30 if the user's preference is "require-convert", goto 100
    40 if the user's preference is "require-no-convert", goto 200
    50 proxy 42 analyzes the unconverted page
    60 if the page contains JavaScript code, goto 200
    70 if the page contains Adobe Flash content, goto 200
    80 if the page contains real-time audio content, goto 200
    90 REM (*these are examples; other criteria for conversion can be added here*)
    100 convert page, e.g., transcode video to UE screen size, scale images, re-arrange page layout, etc.
    110 return converted page to user
    120 (done, terminate)
    200 return unconverted page to user
    210 (done, terminate)

The artisan will understand that the pseudo code above is just one of many possible examples of a processing mechanism, and that Line 90 in the pseudo code is a place-holder for additional desired criteria.

Figure 3:
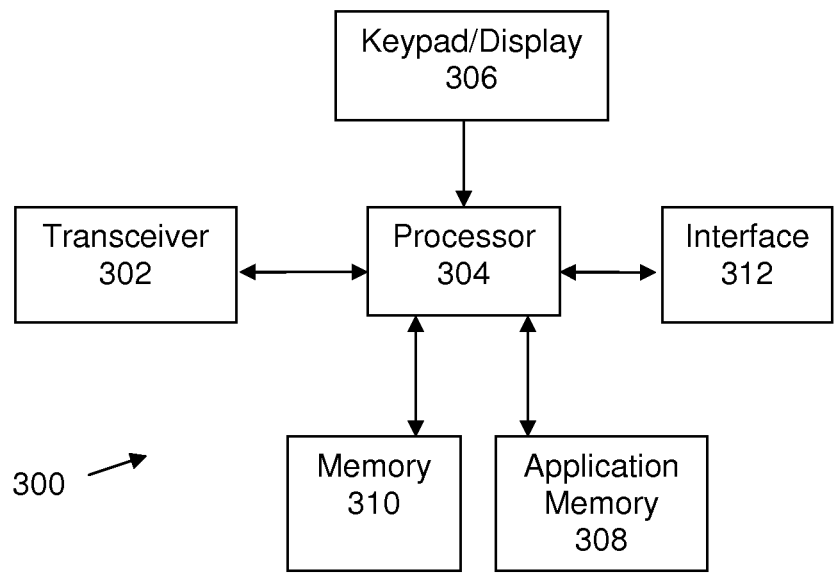
FIG. 3 is a block diagram of a user equipment.

FIG. 3 is a block diagram of a typical UE 300 that is suitable for the invention described in this application. As depicted in FIG. 3, the UE 300 includes a transceiver 302 that is configured to exchange radio signals with BTSs or enodeBs in a network, such as the network 10. Information carried by those signals is handled by an electronic processor 304, which may include one or more sub-processors, and which executes one or more software modules and applications, including modules suitable for web browsing content provided by a server 40 as described in this application, to carry out the operations of the UE 300. Information presented to the user is provided to a display 306, and user input to the terminal 300 is provided through a keypad, touch-screen display, or other device 306. Software applications may be stored in a suitable application memory 308, and the device may also download and/or cache desired information in a suitable memory 310.

The device 300 also includes an interface 312 that can be used to connect other components, such as a computer, keyboard, etc., to the UE 300.

It will be understood that this invention is substantially independent of the arrangement of hardware in the UE 300. For example, the UE functionality can be carried out by a suitable processor 304 that executes software (such as a Java virtual machine, Open Mobile Alliance management objects, etc.) residing in the application memory 308 and executing in the processor 304.

The UE's web browser provides the proxy server 42 with the address (e.g., uniform resource locator (URL)) of a web page requested by the user in the usual way, and in addition the browser is configured to indicate to the proxy 42 a preferred mode of operation according to the user. That indication can be provided in any suitable way, e.g., by adding suitable information in the HTTP headers of the page-request packets sent by the browser to the proxy server 42.

For example, communication between the UE's browser and the proxy 42 can include a dedicated HTTP header that can be called "X-Content-Proxy-Preference". Suitable information elements of the X-Content-Proxy-Preference header indicate the following:

"require-convert", which means always translate the web page;

"automatic", which means translate the web page if the proxy's processing mechanism indicates conversion; and "require-no-convert", which means never translate the web page.

It will be appreciated that other information can be indicated in the X-Content-Proxy-Preference header and other headers as desired.

It will be noted that whether a page is translated depends on user settings (which can also be communicated by HTTP headers). For example, a UE can be set such that a downloaded page has no images, or down-scaled images, or no advertisements, or has its layout preserved (possibly with placeholders), has its layout or reflowed according to the UE's screen size or for minimal cost or bandwidth use. A download can also be transcoded to a video or other format supported by the UE hardware, etc.

To enable a user to select page translation manually, the web browser can be configured in any conventional way to display a button for toggling the mode of operation of the proxy server 42. The button should (by visual appearance) indicate the current mode of operation, i.e., translate web page or not, and whether or not it is possible (as determined by, for example, the different factors affecting policy) to switch mode. A policy (as enforced by the proxy server 42) can specify whether a user can view only translated pages, or can choose freely between translated and untranslated pages. A policy can also relate to customer billing. For example, the policy can state that translated pages are included in the UE's monthly fee, but untranslated pages are charged on a per-kilobyte basis. The information of operating mode and policy decisions can be transferred to the browser from the proxy server 42, for example, as meta-tags or comments in the HTML source information.

Thus, a user needs only a single web browser in the UE to view all kinds of web pages, even those that would ordinarily present problems when viewed on the UE. Even if the pre-processing in the proxy server 42 fails, the server simply falls back to its non-translate mode and serves up untranslated web pages to the UE. In this way, the user is always served the best experience with respect to the available resources.

The default mode of operation of the proxy server 42 can be determined dynamically based on one or more criteria, including user preferences, the current connection type (i.e., lower bandwidth (GPRS, EDGE, etc.) or higher bandwidth (HSPA, LTE, etc.), the download size of the page, the kind of subscription, operator preferences, site preferences, and the availability of Javascript or SSL, for example.

Statistics with respect to particular pages can be collected in the proxy server 42. For a given page, such statistics can reflect how often users or types of UE decide to bypass the proxy 42, thereby enabling automatic selection of the proxy mode, and/or notify the proxy operator of pages that appear to be troublesome for the preprocessing to handle properly. Thus, the collected statistics with respect to respective received web pages can concern how often translated web pages are served compared to how often untranslated web pages are served. Collected statistics can also concern the translation(s), such as scaling and re-formatting, that were actually made by the proxy server for a given page or for a given UE or type of UE, the translation(s) for a given UE or type of UE that were actually made by the proxy server for a given page, and others. The operator of the proxy server 42 can readily identify web pages that the server 42 has problems preprocessing, and can thus act rapidly to improve that preprocessing and the user's experience.

The proxy server 42 can also be used by an operator for charging. By passing UE web access requests through the operator's proxy 42, web content can be provided on a fixed-price basis (e.g., a fixed amount per web page). This can be done regardless of whether a scaled page is provided to the UE's browser or not.

Figure 4:
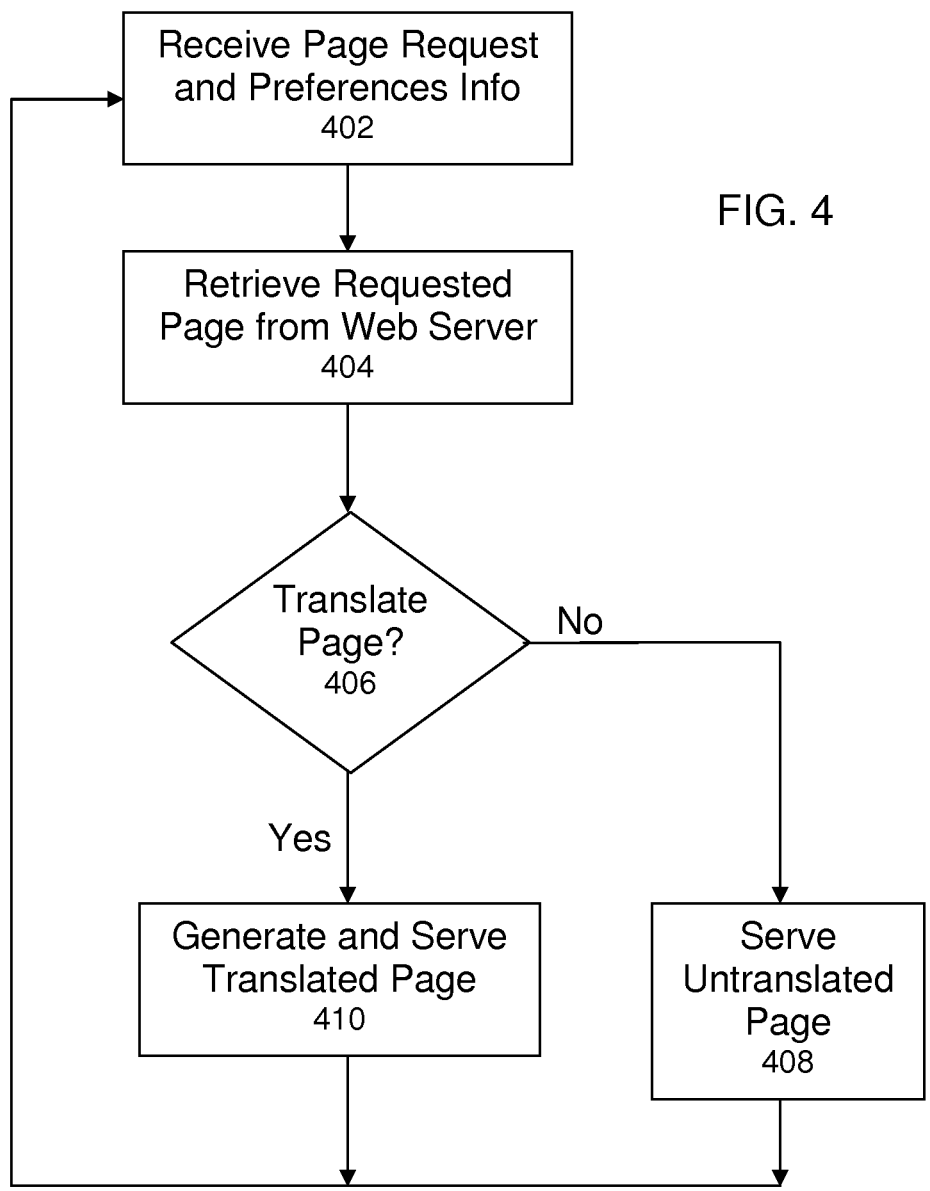
FIG. 4 is a flow chart of a method of selectively preprocessing web pages.

FIG. 4 is a flow chart of a method of selectively preprocessing web pages that can be implemented with the proxy server 42 as described above. In step 402, a web page request is received by the proxy server 42 from a UE 18. As noted above, the request itself can indicate UE capabilities and preferences and is typically generated by a user's clicking on a weblink or entering a URL of a web page in a web browser executing in the UE. Besides UE capabilities and preference, network preferences can be received.

In response to the page request, the proxy server 42 retrieves the requested page from the hosting web server 40 (step 404). For example, the server 42 can simply execute the request in a web browser executing in the server 42.

In step 406, the proxy server 406 determines whether to translate the retrieved web page. If not (No in step 406), the untranslated page is served to the UE's web browser in a conventional way (step 408). If the server 42 determines to translate the retrieved page (Yes in step 406), the server generates the translated page as described above and serves the translated page to the UE's browser in an otherwise conventional way (step 410).

The following describes examples of uses of the proxy server 42.

1. User Decides to Obtain an Untranslated Page

A UE requests a web page to load, and a proxy-generated version is provided (for bandwidth, latency, or other reasons). For example, the requested page contains images from the a vacation trip, and the provided page includes scaled-down images. The user can decide to have the page rendered locally on the UE rather than translated by the proxy server 42, for example, to avoid scaling images. The user requests the original version of the page (i.e., the non-translate mode of the server 42) to be able to zoom images and show others.

2. Proxy Server 42 Decides to Provide an Untranslated Page

A UE requests a web page to load. The proxy server 42 analyzes the requested page and determines, based on its programming, that the page is better viewed with local rendering. For example, a page-embedded web application (e.g., JavaScript) uses location services, which are provided by the UE's GPS components. The UE receives the untranslated web page.

3. Proxy Server 42 Decides to Provide a Translated Page

A UE requests a web page to load. The proxy server 42 analyzes the requested page and determines that parts of it can be executed by the server 42. For example, a page-embedded web application (e.g., JavaScript) uses location services, and the server 42 has information that the UE does not have GPS components. Because location information has to be provided by the network anyway, the proxy server 42 can obtain the corresponding information, execute the web application, and serve up a translated page. The UE receives a modified web page, in which the web application code, e.g., the JavaScript code for obtaining user location, has been replaced with information obtained by the server 42, e.g., the UE's location known by the network.

As described above, whether a UE has GPS components or not can be determined by the server 42 by inspecting the HTTP headers of the UE's page request. Such headers typically include a UE's name, which the server 42 can look up in a server-side database of device capabilities.

4. User Receives an Untranslated Page

A UE requests a web page to load, and the proxy server provides the untranslated page, e.g., because its default mode is non-translate, or the proxy decides that the UE wants the entire page (see Use Case 2 above). The user can decide to have the page translated by the proxy server 42, for example, upon refreshing or reloading the page.

The artisan will recognize that in this particular Use Case, the UE can be configured such that it need not request a translated version of a page that the UE already has stored as an untranslated version. The effort of image scaling, etc., would already have been performed by the UE when the page was first rendered by the UE, and so it may be enough for the UE just to cache the rendered page locally rather than download it again.

It will be appreciated that procedures described above are carried out repetitively as necessary, for example, to respond to the time-varying nature of web page requests and network preferences. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a communication system of selectively preprocessing web pages, comprising:
   receiving a web page request, wherein the request indicates at least one communication preference; the at least one communication preference includes type of communication subscription, current communication bandwidth, retrieved page size, and manual indication; and the at least one communication preference is indicated by either:
      one or more meta-tags or comments in the retrieved page or header information in the web page request, or
      at least one hypertext transfer protocol header included in the web page request;
   in response to the request, forwarding the request to and retrieving a web page corresponding to the request from a web server;
   collecting statistics with respect to respective retrieved web pages;
   determining whether to translate the retrieved web page based on the at least one communication preference, content of the retrieved web page, and collected statistics with respect to the retrieved web page; and
   serving either the retrieved web page or a translated web page in response to the request;
   wherein collected statistics concern at least one of the following:
   how often translated web pages are served compared to how often un-translated web pages are served; and
   type of translation made for respective web pages or initiator of the web page request.

2. A preprocessing proxy server for a communication network, comprising:
   an electronic processor configured to receive web pages requested by a user equipment (UE) and information indicating at least one communication preference of the UE, to determine whether to translate a requested web page based on the at least one communication preference, content of the requested web page, and collected statistics with respect to the requested web page; and to serve to the UE either the requested web page or a translated web page,
   wherein collected statistics concern at least one of the following:
   how often translated web pages are served compared to how often un-translated web pages are served; and
   type of translation made for respective web pages or the UE that requested the web page; and
   the information indicating the at least one communication preference includes either:
      one or more meta-tags or comments in the retrieved page or header information in the web page request, or
      at least one hypertext transfer protocol header included in the web page request.

3. The proxy server of claim 2, wherein the processor includes a processing mechanism that replaces the requested web page with a reformatted, rescaled, dynamically generated page based on at least one of a type of network subscription, bandwidth of a current network connection to the UE, a network-operator preference, and a UE user's request.

4. The proxy server of claim 3, wherein the processing mechanism includes computer program code that configures the processor to do the following:
   inspect the requested web page and at least one of a UE user's preference and an applicable policy;
   translate the requested web page and serve the translated web page to the UE if the applicable policy specifies that the UE user can view only translated pages, or if the UE user's preference is to require translation; and
   serve the requested web page to the UE if the UE user's preference is to require no translation or if the requested web page includes active code.

5. A non-transitory computer-readable medium having instructions that, when executed by a computer, cause the computer to perform a method in a communication system of selectively preprocessing web pages, wherein the method comprises:
   receiving a web page request, wherein the request indicates at least one communication preference; the at least one communication preference includes type of communication subscription, current communication bandwidth, retrieved page size, and manual indication; and the at least one communication preference is indicated by either:
      one or more meta-tags or comments in the retrieved page or header information in the web page request, or
      at least one hypertext transfer protocol header included in the web page request;
   in response to the request, forwarding the request to and retrieving a web page corresponding to the request from a web server;
   determining whether to translate the retrieved web page based on the at least one communication preference, content of the retrieved web page, and collected statistics with respect to the retrieved web page; and
   serving either the retrieved web page or a translated web page in response to the request;
   wherein collected statistics concern at least one of the following:
   how often translated web pages are served compared to how often un-translated web pages are served; and
   type of translation made for respective web pages or initiator of the web page request.

* * * * *